3,297,712
PRODUCTION OF METAL-FREE
PHTHALOCYANINES
Herbert Mueller, Frankenthal, Pfalz, Germany, assignor to Badische Anilin- & Soda-Fabrik Aktiengesellschaft, Ludwigshafen (Rhine), Germany
No Drawing. Filed May 22, 1964, Ser. No. 369,615
Claims priority, application Germany, June 1, 1963,
B 72,151
4 Claims. (Cl. 260—314.5)

This invention relates to a new process for the production of metal-free phthalocyanines in which aromatic ortho-dinitriles are heated with hydrogen under superatmospheric pressure.

Direct and indirect methods are known for the synthesis of metal-free phthalocyanines. The indirect methods, in which metalliferous phthalocyanines are first prepared which are then demetallized, as a rule give better yields than the direct methods, but they require higher operating costs owing to the additional step of demetallization which is not always complete. An indirect method of this type is described for example in U.S. patent specification No. 2,116,602 in which a metalliferous phthalocyanine is obtained by reaction of phthalodinitrile with an alkali metal or alkaline earth metal alcoholate, and the metalliferous phthalocyanine is converted into a metal-free phthalocyanine by a proton active agent, as for example water or alcohol, which is used in excess.

A direct method for the production of metal-free phthalocyanines in which phthalodinitrile is heated in the presence of catalytic basic compounds, such as ammonia or tertiary amines, is known for example from U.S. patent specification No. 2,116,602 and from British patent specification No. 410,814. This method is difficult to reproduce and gives a product contaminated with catalyst in an unsatisfactory yield. By the methods known from U.S. patent specification Nos. 2,000,051 and 2,000,052 metal-free phthalocyanines are obtained direct by heating ortho-cyanobenzamide with magnesium or antimony in the absence or presence of ammonia. Yields of 30 to 40% are obtained. A similar process catalyzed by antimony is described in U.S. patent specification No. 2,820,796 in which a mixture of phthalic anhydride, urea, ammonium chloride and antimony is heated. Metal-free phthalocyanine is thus obtained in a greatly contaminated condition in yields of about 60%. The economically advantageous method for the production of metalliferous phthalocyanines known from U.S. patent specification No. 2,197,450 and referred to as the "urea method" does not provide any possibility for an advantageous production of metal-free phthalocyanines because the said metalliferous phthalocyanines, particularly those containing heavy metals, are extremely stable and practically cannot be demetallized.

I have now found that metal-free phthalocyanines are obtained in a very pure form and in an almost quantitative yield by heating aromatic ortho-dinitriles with hydrogen under superatmospheric pressure, preferably in the presence of a solvent.

When using phthalodinitrile, the reaction according to this invention follows the course:

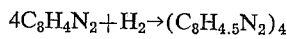

Examples of suitable aromatic ortho-dinitriles which may be used for this process are the ortho-dinitriles of benzene, naphthalene and anthracene. Those ortho-dinitriles of the said kind are however also suitable which bear substituents, as for example alkyl groups, aryl groups, alkoxy groups, nitro groups or halogen atoms. Mixtures of different ortho-dinitriles may also be used for the process according to the invention.

The reaction for the production of metal-free phthalocyanines is preferably carried out in the presence of solvents. The new process may however also be carried out in the absence of solvents. Suitable solvents are those which do not, or practically do not, react with the ortho-dinitriles under the reaction conditions. The following examples may be given: hydrocarbons, such as benzene, cyclohexane or n-heptane, or compounds having functional groups, such as diethyl ether, 2-ethylhexanol, acetone, quinoline, dioxane, tetrahydrofurane, octanol, ethyl acetate or mixtures of two or more solvents. The amount of solvent used is not critical. It may amount for example to 10 to 60% of the amount of dinitrile in the reaction mixture. More dilute solutions may be used without detriment to the process provided the greater reaction volume thereby occasioned can be tolerated.

Reaction of the aromatic ortho-dinitrile with hydrogen takes place under superatmospheric pressure and at elevated temperature. Temperatures of 100° to 500° C. and hydrogen partial pressures of 50 to 400 atmospheres gage are suitable. It is advantageous to choose temperatures between 150° and 300° C. and hydrogen partial pressures of 100 to 200 atmospheres gage. At temperatures lower than 150° C. and at hydrogen partial pressure of less than 100 atmospheres gage, the reaction proceeds slowly and incompletely, whereas the use of temperatures higher than 300° C. and hydrogen partial pressures higher than 300 atmospheres gage, particularly in conjunction with too high temperatures, causes side reactions and the yield may consequently be decreased. For example ammonia may be disengaged if the hydrogen pressure is too high. The optimum temperatures and pressures depend not only on the dinitrile chosen but also on procedural conditions, as for example residence period and efficiency of mixing of the reaction products. With a given set of process conditions, it is therefore advantageous to discover by a small experiment what the optimum pressure and temperature conditions are. It may be stated generally that short residence periods permit higher temperatures and pressures than longer residence periods. It follows from this that the stated ranges of temperature and pressure may be varied according to the apparatus conditions chosen. Small amounts of air in the autoclaves are not usually troublesome.

In carrying out the process, the hydrogen may be activated by adding catalytic amounts of conventional hydrogenation catalysts, as for example those based on chromium, cobalt, nickel, copper, platinum or palladium. The addition of a little phthalocyanine to the reaction mixture may also be advantageous. The reaction proceeds with adequate speed and high yields however even without the said additives. Such additives are also very often dispensed with to avoid contamination of the reaction product by catalyst residues. When correct conditions as regards pressure and temperature are chosen, it is easy to achieve yields of 80 to 90%, or even 100%, with reference to the dinitrile reacted. If the reaction is stopped prior to the complete reaction of the dinitrile, the unreacted dinitrile can easily be separated from the insoluble and non-distillable phthalocyanine by conventional methods, as for example precipitation, distillation, crystallization or extraction, and to return it for fresh reaction. Hydrogen used in excess in the pressure reaction may be recovered and used again.

The reaction according to the invention may advantageously be carried out in moving autoclaves or in autoclaves fitted with stirring means; they may be made for example from alloy steels or iron.

The metal-free phthalocyanines obtainable according to the new process are valuable pigments and may be used for example in the unmetallized form and also after metallization for example with copper or nickel.

Example 1

300 parts of phthalodinitrile is heated in 270 parts of dioxane for eight hours at 200° C. under a hydrogen pressure of 150 atmospheres gage in a stainless steel vibrated autoclave having a capacity of 1 liter. The reaction product is extracted with acetone until the acetone used for extraction remains clear and uncolored. The extraction residue consists of 260 parts of pure violet phthalocyanine which can be identified by elementary analysis, infrared spectrum and X-ray investigations. 25 parts of pure phthalodinitrile may be recovered from the acetone extract by precipitation with water and recrystallization from alcohol and may be used again in the reaction.

Similar results are obtained by carrying out the reaction, not in dioxane, but in 2-ethylhexanol, quinoline, acetone, ethyl acetate, benzene, tetrahydrofurane, cyclohexane or heptane at 190° C. and a hydrogen pressure of 100 atmospheres gage.

Example 2

30 parts of phthalodinitrile is heated under a pressure of 180 atmospheres gage of hydrogen and while shaking for eight hours at 200° C. in a stainless steel autoclave having a capacity of 0.25 liter. The autoclave is then cooled and the reaction product discharged and extracted with dioxane for eight hours. The extraction residue is dried and 26 parts of pure phthalocyanine is obtained.

Example 3

30 parts of 4-phenylphthalodinitrile is reacted in the presence of 70 parts of dioxane under the reaction conditions given in Example 2. 15 parts of blue tetraphenylphthalocyanine is obtained.

Example 4

5 parts of x-chlorophthalodinitrile and 12 parts of phthalodinitrile are reacted for eight hours together with 30 parts of dioxane under the reaction conditions given in Example 2. 8 parts of a blue phthalocyanine containing 5% of chlorine is obtained.

Example 5

300 parts of phthalodinitrile is heated in a 1 liter vibrated autoclave for ten hours at a hydrogen pressure of 350 atmospheres gage at 200° C. The autoclave is cooled and the reaction product is extracted for fifteen hours with boiling dioxane. The extraction residue, consisting of pure phthalocyanine, is dried. The yield is 233 parts.

I claim:
1. A process for the production of metal-free phthalocyanines which comprises heating an aromatic dinitrile selected from the group consisting of phthalodinitrile, chlorophthalodinitrile, phenylphthalodinitrile, naphthalene-ortho-dinitrile and anthracene-ortho-dinitrile in the presence of hydrogen under a pressure of 50 to 400 atmospheres gage at temperatures of from 100° to 500° C.
2. A process as claimed in claim 1 carried out in the presence of a solvent.
3. A process as claimed in claim 1 carried out in the presence of a hydrogenation catalyst.
4. A process as claimed in claim 1, wherein a mixture of different aromatic dinitriles is used.

No references cited.

WALTER A. MODANCE, *Primary Examiner.*

J. A. PATTEN, *Assistant Examiner.*